(12) United States Patent
Carpenter et al.

(10) Patent No.: US 11,519,335 B1
(45) Date of Patent: Dec. 6, 2022

(54) TURBINE ENGINE IGNITION SYSTEM AND METHOD

(71) Applicant: Unison Industries, LLC, Jacksonville, FL (US)

(72) Inventors: Jay Joseph Carpenter, St. Augustine, FL (US); Bruce Edward Dolmovich, Jacksonville, FL (US)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 17/459,128

(22) Filed: Aug. 27, 2021

(51) Int. Cl.
| | | |
|---|---|---|
| *F02C 7/26* | (2006.01) | |
| *F02C 7/266* | (2006.01) | |
| *H01F 38/12* | (2006.01) | |
| *F02P 15/00* | (2006.01) | |

(52) U.S. Cl.
CPC ............ *F02C 7/266* (2013.01); *F02P 15/003* (2013.01); *H01F 38/12* (2013.01); *F05D 2220/32* (2013.01); *F05D 2260/99* (2013.01)

(58) Field of Classification Search
CPC ........... F02C 7/266; F02C 7/26; F02P 15/003; H01F 38/12; F05D 2220/32; F05D 2260/99
See application file for complete search history.

(56) References Cited

U.S. PATENT DOCUMENTS

| | | |
|---|---|---|
| 4,129,895 A | 12/1978 | Witting |
| 5,053,913 A | 10/1991 | Lozito et al. |
| 5,065,073 A | 11/1991 | Frus |
| 5,148,084 A | 9/1992 | Frus |
| 5,245,252 A | 9/1993 | Frus et al. |
| 5,399,942 A | 3/1995 | Frus |
| 5,548,472 A * | 8/1996 | Balland ............... H03K 3/57 361/256 |
| 5,561,350 A | 10/1996 | Frus et al. |
| 5,862,033 A | 1/1999 | Geislinger et al. |
| 6,191,536 B1 | 2/2001 | Dolmovich |
| 9,399,954 B2 | 7/2016 | Wright |
| 9,593,660 B2 | 3/2017 | Wright |
| 9,622,331 B2 | 4/2017 | Cochran |
| 10,030,584 B2 | 7/2018 | Kempinski |
| 2020/0186040 A1 | 6/2020 | Carpenter et al. |

FOREIGN PATENT DOCUMENTS

CN 207892709 U 9/2018

* cited by examiner

*Primary Examiner* — Jacob M Amick
(74) *Attorney, Agent, or Firm* — McGarry Bair PC

(57) ABSTRACT

An ignition system for igniting fuel in a gas turbine engine includes a power supply and an energy storage network electrically connected to the power supply. The energy storage network includes a first stage having a first capacitor and a second stage having a second capacitor. The ignition system further includes an engine igniter electrically coupled to the energy storage network.

20 Claims, 7 Drawing Sheets

TURBINE ENGINE IGNITION SYSTEM AND METHOD

TECHNICAL FIELD

The disclosure relates to ignition systems, and more specifically to ignition systems for combustion in turbine engines.

BACKGROUND

Turbine engines, and particularly gas or combustion turbine engines, are rotary engines that extract energy from a flow of pressurized combusted gases passing through the engine onto rotating turbine blades.

Gas turbine engines for aircraft typically include an ignition system to aid in the starting of the engine. The engine ignition system may include an ignition exciter that stores energy, as well as leads and igniters to convey the exciter stored energy controllably to create a high-energy spark to produce combustion of fuel in the engine.

DETAILED DESCRIPTION

Figure 1:
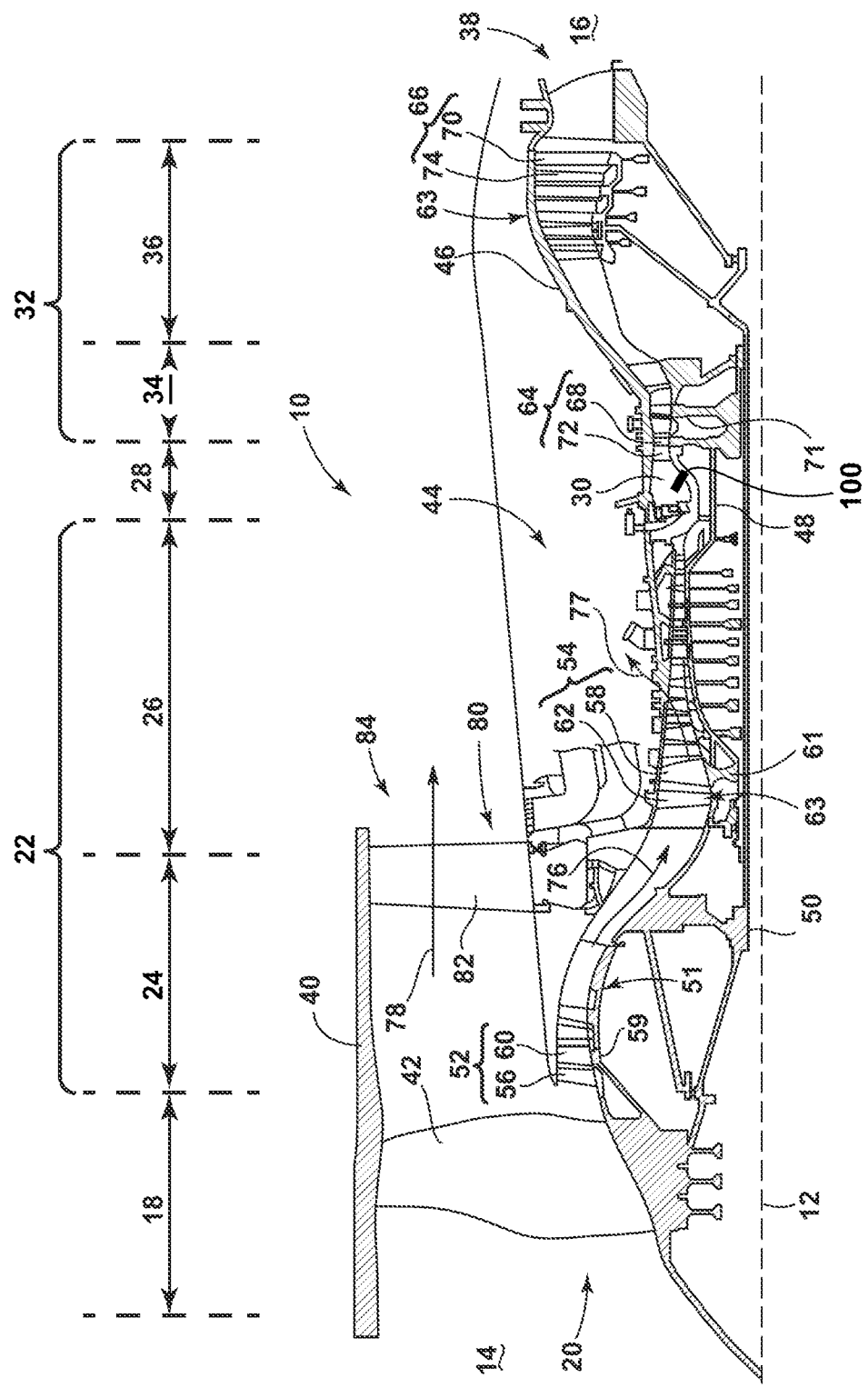
FIG. 1 is a schematic cross-sectional diagram of a turbine engine for an aircraft including an ignition system in accordance with various aspects described herein.

The described embodiments of the present disclosure are directed to an ignition system. For purposes of illustration, the present disclosure will be described in the exemplary environment of an aircraft turbine engine. It will be understood, however, that the disclosure is not so limited and may have general applicability within other systems, including other ignition systems, as well as in non-aircraft applications, such as other mobile applications and non-mobile industrial, commercial, and residential applications.

Typical engine ignition systems require high-voltage elements, for example 2000 V-20,000 V, for components such as power supplies, semiconductor devices, energy storage capacitors, and the like, wherein a large amount of energy is stored and discharged to an engine igniter. Such elements can be expensive to acquire or manufacture. For example, traditional charging converter power transformers require insulation of the windings for high-voltage use. The described aspects of the present disclosure provide for an ignition system utilizing lower-voltage components that are more readily available, replaceable, or serviceable while still meeting power requirements for ignition. The ignition system of the present disclosure can include an energy storage network having multiple power stages. The ignition system of the present disclosure can include an energy storage network having a similar arrangement to a Marx generator. Marx generators are known to include power storage components charged along a parallel electrical connection and discharged along a series electrical connection. Aspects of the ignition system described herein provide the technical effect of modification of a power output from a staged circuit or energy storage network for exciting an engine igniter with the needed power characteristics.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. In another non-limiting example, a controller module can also include a data storage component accessible by the processor, including memory, whether transient, volatile or non-transient, or non-volatile memory.

Furthermore, as used herein, a "control module" can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module.

Furthermore, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

Additionally, while terms such as "voltage", "current", and "power" can be used herein, it will be evident to one skilled in the art that these terms can be interrelated when describing aspects of the electrical circuit, or circuit operations. Additionally, as used herein, "electrical connection" or "electrically coupled" can include a wired or wireless connection between respective components. Such an electrical connection can include a physical connection between the respective components, such as a wired connection including Ethernet, or can include wireless transmission connections, including, but not limited to, WiFi (e.g. 802.11 networks), Bluetooth, or the like.

Additionally, as used herein, a value being "generally" constant or "nearly" constant will refer to a value that does not vary over time by more than a predetermined amount. In one non-limiting example, a value being "generally" or "nearly" constant can refer to a value not varying by more than 15%. In another non-limiting example, a value being "generally" or "nearly" constant can refer to a value not varying by more than 10%. In still another non-limiting example, a value being "generally" or "nearly" constant can refer to a value not varying by more than 5%.

Additionally, as used herein, the terms "generally" or "nearly" will refer to a value being within a predetermined range of a particular value or a threshold. In one non-limiting example, a capacitor being "generally" or "nearly" fully charged can refer to a capacitor being within 10% of a fully-charged state. In another non-limiting example, a capacitor being "generally" or "nearly" fully discharged can refer to a capacitor being within 10% of a fully-discharged state.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of an engine 10 (e.g., a gas turbine engine) for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The static turbine vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor section 22 and the turbine section 32 are also referred to individually or collectively as a stator 63. As such, the stator 63 can refer to the combination of non-rotating elements throughout the engine 10.

An ignition system 100 can also be included within the engine 10. For example, within the combustor 30, one or more igniter plugs can be electrically coupled to an ignition exciter circuit receiving power from a power supply. The ignition system 100 can facilitate the initiation of combustion of fuel, a fuel-air mixture, or the like in the combustor 30.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited by the ignition system 100, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized air 76 can be drawn from the compressor section 22 as bleed air 77. The bleed air 77 can be drawn from the pressurized air 76 and provided to engine components requiring cooling. The temperature of pressurized air 76 entering the combustor 30 is significantly increased. As such, cooling provided by the bleed air 77 is necessary for operating of such engine components in the heightened temperature environments.

A remaining portion of the airflow 78 bypasses the LP compressor 24 and core 44 and exits the engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
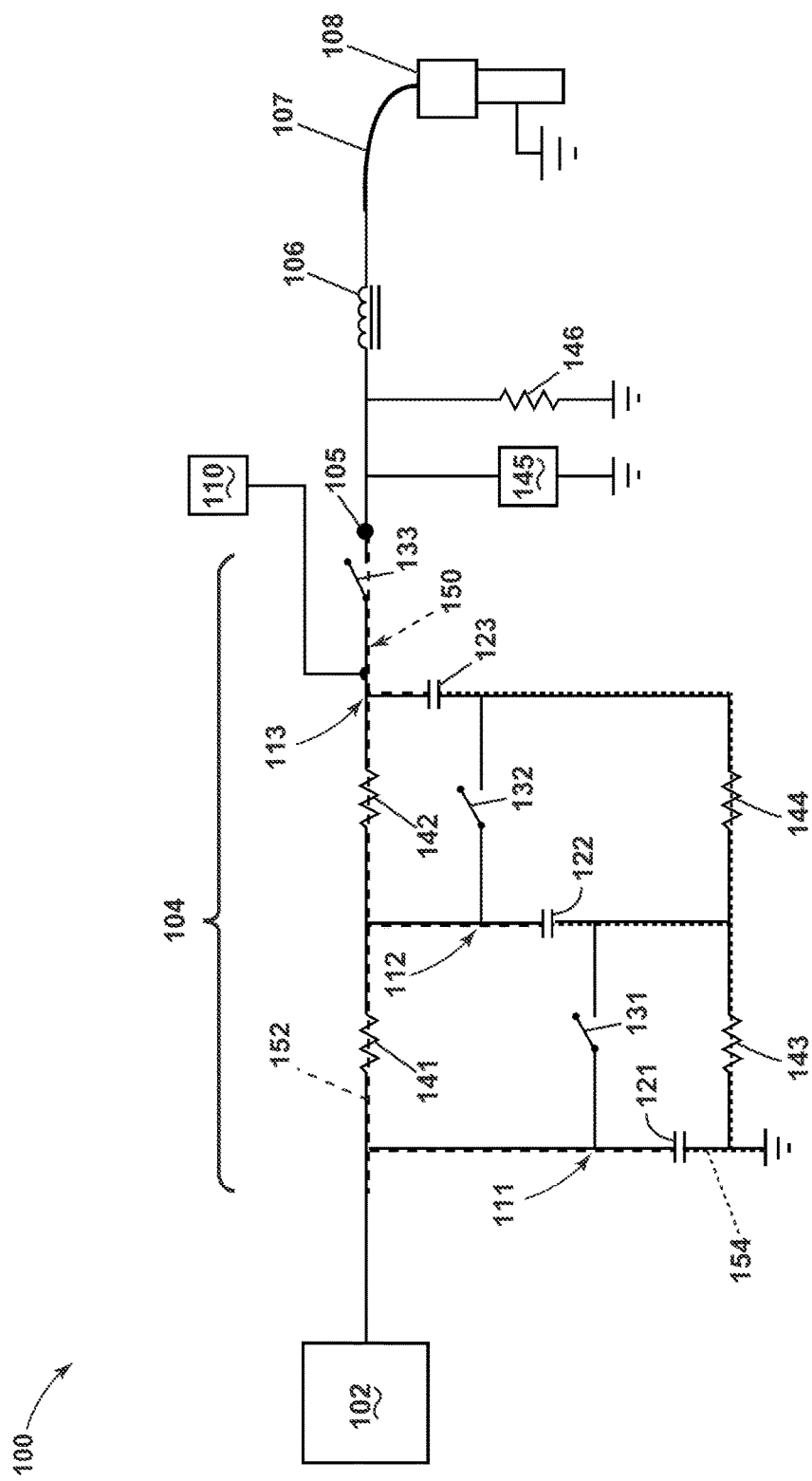
FIG. 2 is a schematic diagram of an ignition system that can be utilized in the turbine engine of FIG. 1 in accordance with various aspects described herein.

Referring now to FIG. 2, the ignition system 100 is illustrated in one exemplary form that can be utilized with the engine 10. The ignition system 100 can include a power supply 102, an energy storage network 104, an inductor 106, an ignition lead 107, and an engine igniter 108 arranged in series. The energy storage network 104 can be electrically coupled to the power supply 102 and include a network power output 105. In this manner the power supply 102 can provide power, current, voltage, or the like, for charging the energy storage network 104. The inductor 106 can be electrically coupled to the network power output 105, and the engine igniter 108 can be electrically coupled to the inductor 106. In one non-limiting example, the engine igniter 108 can be directly connected to the inductor 106. In this manner the energy storage network 104, charged by the power supply 102, can function as an exciter circuit providing stored energy to the engine igniter 108.

The power supply 102 can include an alternating current (AC) power supply or a direct current (DC) power supply. It will be understood that other components not explicitly shown in FIG. 2 can also be provided in the ignition system 100, including converters, inverters, rectifiers, or the like.

The energy storage network 104 can include multiple stages. Each stage can be capable of storing or providing power to the network power output 105. In the example of FIG. 2, a first stage 111, a second stage 112, and a third stage 113 are illustrated. Any number of stages can be utilized. Aspects of the disclosure can be included wherein any number of stages can be additive for storing or providing power to the network power output 105, as explained herein.

The first stage 111 can include a first capacitor 121 and a first switch 131. The second stage 112 can include a second capacitor 122 and a second switch 132. The third stage 113 can include a third capacitor 123 and a third switch 133. Each of the first switch 131, second switch 132, and third switch 133 can have an open state (shown in FIG. 2) and a closed state (shown in FIG. 3). Isolation components, such as resistors, inductors, or diodes can also be provided in the energy storage network 104. In the illustrated example isolation resistors are provided and can be used during capacitor charging, and can also prevent shorting of the switches 131, 132, 133 during discharge. In the example shown, a first resistor 141, second resistor 142, third resistor 143, and fourth resistor 144 are provided. The first resistor 141 can be electrically connected to the first capacitor 121 and the first switch 131. The second resistor 142 can be electrically connected to the second capacitor 122 and the second switch 132. The third resistor 143 can be electrically connected to the first capacitor 121 and the second capacitor 122. The fourth resistor 144 can be electrically connected to the second capacitor 122 and the third capacitor 123. In this manner the resistors 141, 142, 143, 144 can provide for controlled or indirect charging of the first, second, or third capacitors 121, 122, 123. In a non-limiting example, the first capacitor 121 can be directly charged from the power supply 102. In a non-limiting example, the second capacitor 122 can be indirectly charged from the power supply 102 by way of the first capacitor 121, the first resistor 141, and the third resistor 143. In a non-limiting example, the third capacitor 123 can be indirectly charged from the power supply 102 by way of the first resistor 141, second resistor 142, third resistor 143, and fourth resistor 144.

Any suitable capacitor, resistor, or switch can be used in the energy storage network 104. In some non-limiting examples, the first capacitor 121, second capacitor 122, or third capacitor 123 can include a film capacitor, ceramic capacitor, electrolytic capacitor, or supercapacitor, or the like, or combinations thereof. In non-limiting examples, the first resistor 141, second resistor 142, third resistor 143, or fourth resistor 144 can include a fixed resistor, variable resistor, thermistor, varistor, or the like, or combinations thereof.

At least one of the first switch 131, second switch 132, or third switch 133 can include a controllable switch or a semicontrollable switch. Some non-limiting examples of controllable switches include a semiconductor switch, non-semiconductor pulse power switch, metal-oxide-semiconductor field-effect transistor (MOSFET), insulated-gate bipolar transistor (IGBT), silicon controlled rectifier (SCR), MOS-controlled thyristor (MCT), integrated gate-commutated thyristor (IGCT), gate turn-off (GTO) thyristor, relay, or the like. Some non-limiting examples of semicontrollable switches include a spark gap, breakover diode, silicon diode for alternating current (SIDAC), or the like. In one non-limiting example, the first switch 231 can include a controllable switch such an MCT, the second switch 232 and third switch 233 can include a semicontrollable switch such as a spark gap, and the inductor 106 can include an air core coil. In another non-limiting example, each of the first switch 131, second switch 132, and third switch 133 can include a controllable switch, and the inductor 106 can include a saturable reactor.

In still another non-limiting example, other impedance components, including inductors or diodes, can be utilized in place of any or all of the first resistor 141, second resistor 142, third resistor 143, or fourth resistor 144. In such a case, the impedance components can include an air core inductor, iron core inductor, toroidal inductor, or the like.

A clamp rectifier 145 can be electrically connected to the network power output 105. In one non-limiting example the clamp rectifier 145 can be in the form of a unipolar diode though this need not be the case. The clamp rectifier 145 can provide for supporting a peak current load to the inductor 106 during operation of the ignition system 100. In another non-limiting example, a resistor 146 can be electrically coupled between the clamp rectifier 145 and the inductor 106 and shunted to ground.

The inductor 106 can include at least one inductor coil. In the illustrated example, the inductor 106 is shown in the form of a saturable reactor with at least one inductor coil wound about a magnetically-saturable core as is known in the art. In such a case, the core of the inductor 106 can become magnetically saturated as energy is unidirectionally transferred from the network power output 105 to the inductor 106. It will be understood that while illustrated as a saturable reactor, the inductor 106 can have any suitable form including an air coil inductor.

Optionally, a comparison module 110 can be provided in the ignition system 100. The comparison module 110 can sense or detect an overall voltage of the energy storage network 104 due to the stored energy in the first, second, and third capacitors 121, 122, 123. The comparison module can also compare the overall voltage of the energy storage network to a voltage set point. The comparison module 110 is schematically illustrated as being coupled to the energy storage network 104 adjacent the third switch 133. It will be understood that the comparison module 110 can be coupled to one or more locations in the energy storage network 104 for sensing or comparing voltages therein. The comparison module 110 can also be electrically connected to a controller or other component for providing a control signal or communication signal indicative of an operating parameter of the ignition system 100. In one non-limiting example, the comparison module 110 can detect when a sensed voltage has reached a predetermined threshold voltage for sending power to the engine igniter 108. In another non-limiting example, the comparison module 110 can form a voltage sensing signal which is compared to a voltage set point.

When the first switch 131, second switch 132, and third switch 133 are in the open state as shown in FIG. 2, a parallel electrical connection 150 can be defined or enabled between the power supply 102, first capacitor 121, second capacitor 122, and third capacitor 123. In the example of FIG. 2, the parallel electrical connection 150 is illustrated for visual clarity with a higher-voltage portion 152 in long dashed line and a lower-voltage portion 154 in short dashed line. It will be understood that the higher-voltage portion 152 can have a higher voltage relative to the lower-voltage portion 154. In one non-limiting example, the higher-voltage portion 152 can be electrically coupled to the power supply 102 while the lower-voltage portion 154 can be electrically coupled to ground. In this manner the power supply 102 can simultaneously charge the first capacitor 121, second capacitor 122, and third capacitor 123 by way of the parallel electrical connection 150.

Figure 3:
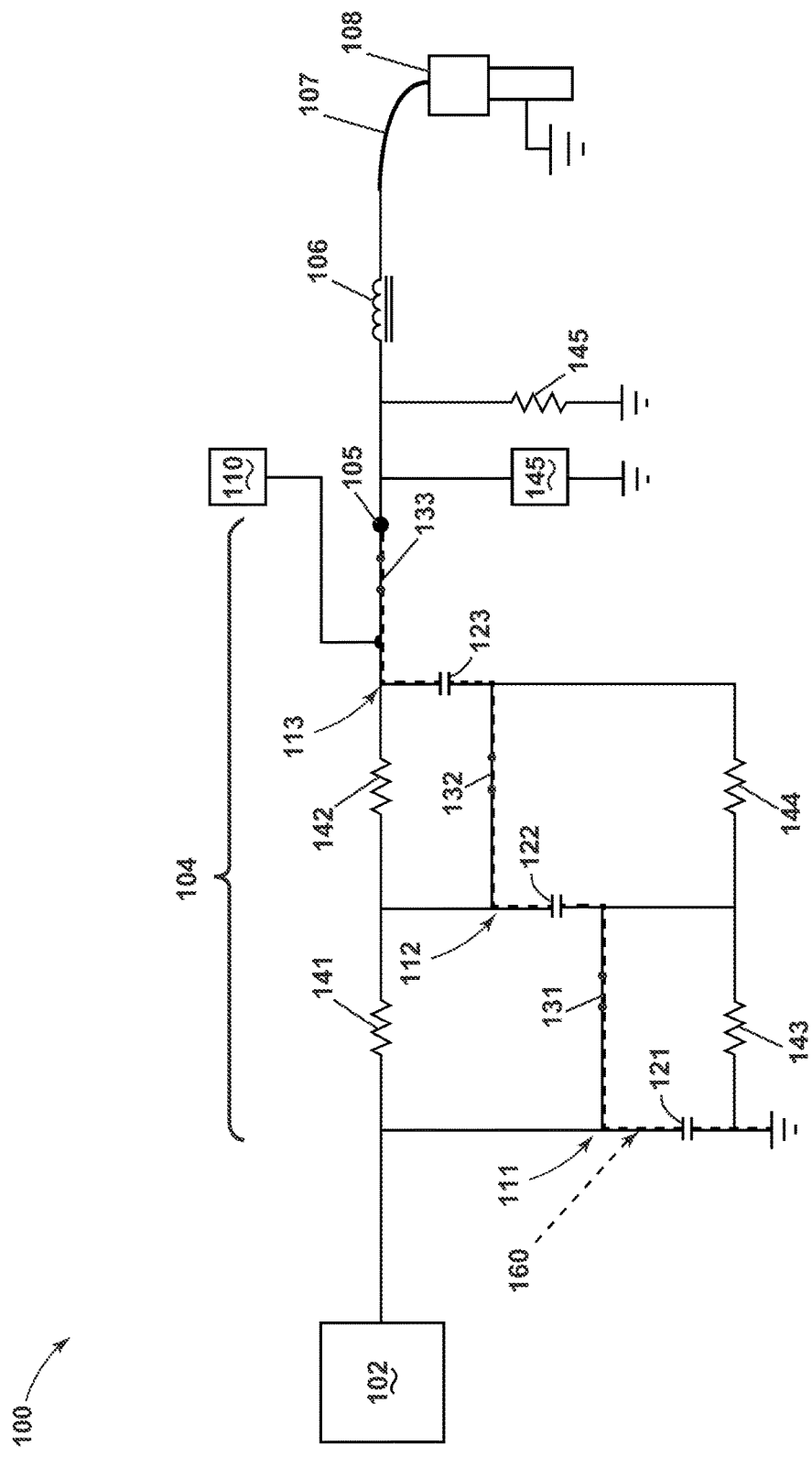
FIG. 3 is a schematic diagram of the ignition system of FIG. 2 during a mode of operation.

The energy storage network 104 can include a first configuration and a second configuration when the first switch 131, second switch 132, and third switch 133 are in an open state (as shown in FIG. 2), or in a closed state (as shown in FIG. 3), respectively. The first configuration can enable the parallel electrical connection 150 (FIG. 2) and provide for simultaneous charging of energy storage capacitors in each stage, such as the first capacitor 121, second capacitor 122, and third capacitor 123. The second configuration is shown in FIG. 3 and enables a series electrical connection between the energy storage capacitors in each stage, e.g. the first capacitor 121, second capacitor 122, and third capacitor 123. Such a series electrical connection can provide for a summated discharge of the individual capacitors in the energy storage network 104 to the network power output 105 as described below.

Turning to FIG. 3, the energy storage network 104 is illustrated when the first switch 131, second switch 132, and third switch 133 are in the closed position. In this configuration, a series electrical connection 160 can be defined or enabled between the first capacitor 121, second capacitor 122, third capacitor 123, and the network power output 105. The series electrical connection 160 can enable the first capacitor 121, second capacitor 122, and third capacitor 123 to discharge to the network power output 105. In this manner, the series electrical connection 160 can define the output power at the network power output 105.

With general reference to FIGS. 1-3, during operation of the ignition system 100, the power supply 102 can supply power simultaneously to the first capacitor 121, second capacitor 122, and third capacitor 123 by way of the parallel electrical connection 150 (FIG. 2). The first, second, and third switches 131, 132, 133 can remain in an open state during charging of the first, second, and third capacitors 121, 122, 123.

When a predetermined voltage or power level is reached, for example across any or all of the stages 111, 112, 113, the first, second, and third switches 131, 132, 133 can change to a closed state, thereby enabling the series electrical connection 160 (FIG. 3). The power or energy stored in each of the first, second, and third capacitors 121, 122, 123 can be discharged in series, providing a summated output power to the network power output 105. In one example, a controller can controllably operate any of the first switch 131, second switch 132, or third switch 133 to change or move from the open state to the closed state. In another example, the first switch 131, second switch 132, or third switch 133 can automatically change or move from the open state to the closed state.

A resonant LC tank circuit can be formed between the energy storage network 104 and the inductor 106 as the summated output power from the energy storage network 104 is provided at the network power output 105. Current in the closed, series-connected switches 131, 132, 133 can slowly rise during a first time interval immediately after changing to the closed state. Such a first time interval can have a duration of 0.1 microseconds to 1 microsecond, or between 1 microsecond and 10 microseconds, or between 2 microseconds and 5 microseconds, in non-limiting examples. During the first time interval, the capacitors 121, 122, 123 can deliver energy to the inductor 106. In one example where the inductor 106 is in the form of a saturable reactor, the inductor 106 can begin to saturate. A second time interval can commence once the inductor 106 is fully saturated, during which time the resonant frequency of the LC tank circuit is shifted and the current through the closed switches 131, 132, 133 rises faster compared to the first time interval. The second time interval can have a duration of between 1 microsecond and 200 microseconds, or between 1 microsecond and 25 microseconds, or between 50 microseconds and 150 microseconds, or between 100 nanoseconds and 10 microseconds, in non-limiting examples. The first time interval and second time interval can collectively define a resonant energy transfer phase wherein stored energy in the capacitors 121, 122, 123 is transferred to the inductor 106.

Once the first, second, and third capacitors 121, 122, 123 are fully discharged, the LC tank circuit can shift from the resonant energy transfer phase to an inductive energy delivery phase. In this phase, the clamp rectifier 145 can turn from an OFF state to an ON state. In one non-limiting example wherein the clamp rectifier 145 includes a unipolar diode, the ON state can correlate to a forward-biased state of the unipolar diode. When in the ON state, the clamp rectifier 145 can support providing a peak current from the inductor 106 to the engine igniter 108. Current through the inductor 106 can be supplied to the engine igniter 108 for generating an ignition spark. The current through the inductor 106 can fall back to zero as the stored inductive energy is provided to the engine igniter 108.

In this manner, the inductor 106 can be configured to form a modified power output based on output power received from the network power output 105. The engine igniter 108 electrically coupled to the inductor 106 can be configured to produce an ignition spark upon receiving the modified output power. In the non-limiting example wherein the inductor 106 is in the form of a saturable reactor, upon the initiation of energy transfer during the first time interval of the resonant energy transfer phase, the core of the inductor is not yet saturated and the inductance of the inductor 106 is relatively very high. The current through the first, second, and third switches 131, 132, 133 can also increase at a more controlled rate due to the relatively high inductance of the inductor 106, thereby reducing or eliminating jitter in the supplied current from closing of the switches 131, 132, 133. In a non-limiting example wherein the inductor 106 is in the form of a saturable reactor, as the core of the inductor 106 approaches saturation, the effective inductance of the inductor 106 decreases, allowing the current through the engine igniter 108 to increase at a significantly greater rate during the second time interval of the resonant energy transfer phase. In other non-limiting examples, the inductor 106 can be an air core coil, or the inductor 106 can be included partially or wholly within the ignition lead 107 inductance. In such cases the inductor 106 can form the modified power output based on its own resistance to changes in current flow, such as when the first, second, and third switches 131, 132, 133 close and provide their summated power to the network power output 105. In this manner the inductor 106 can provide a modified output power having a smoothed or shaped pulse to the engine igniter 108. Such pulse smoothing can provide for a longer, more controlled, or more steady ignition spark in the engine igniter 108. In one non-limiting example, the modified output power can include at least one of a pulse voltage between 800 V and 1200 V, a pulse current between 200 A and 1000 A, a pulse duration between 1 microsecond and 200 microseconds, or a pulse width between 1 microsecond and 100 microseconds. In another non-limiting example, the modified output power can include at least one of a pulse voltage between 2500 V and 25,000 V, a pulse current between 200 A and 2000 A, or a pulse duration between 5 microseconds and 300 microseconds. In another non-limiting example, the modified output power can include at least one of a pulse voltage between 800 V and 25,000 V, a pulse current between 200 A and 2000 A, a pulse duration between 1 microsecond and 300 microseconds, or a pulse width between 1 microsecond and 100 microseconds.

Figure 4:
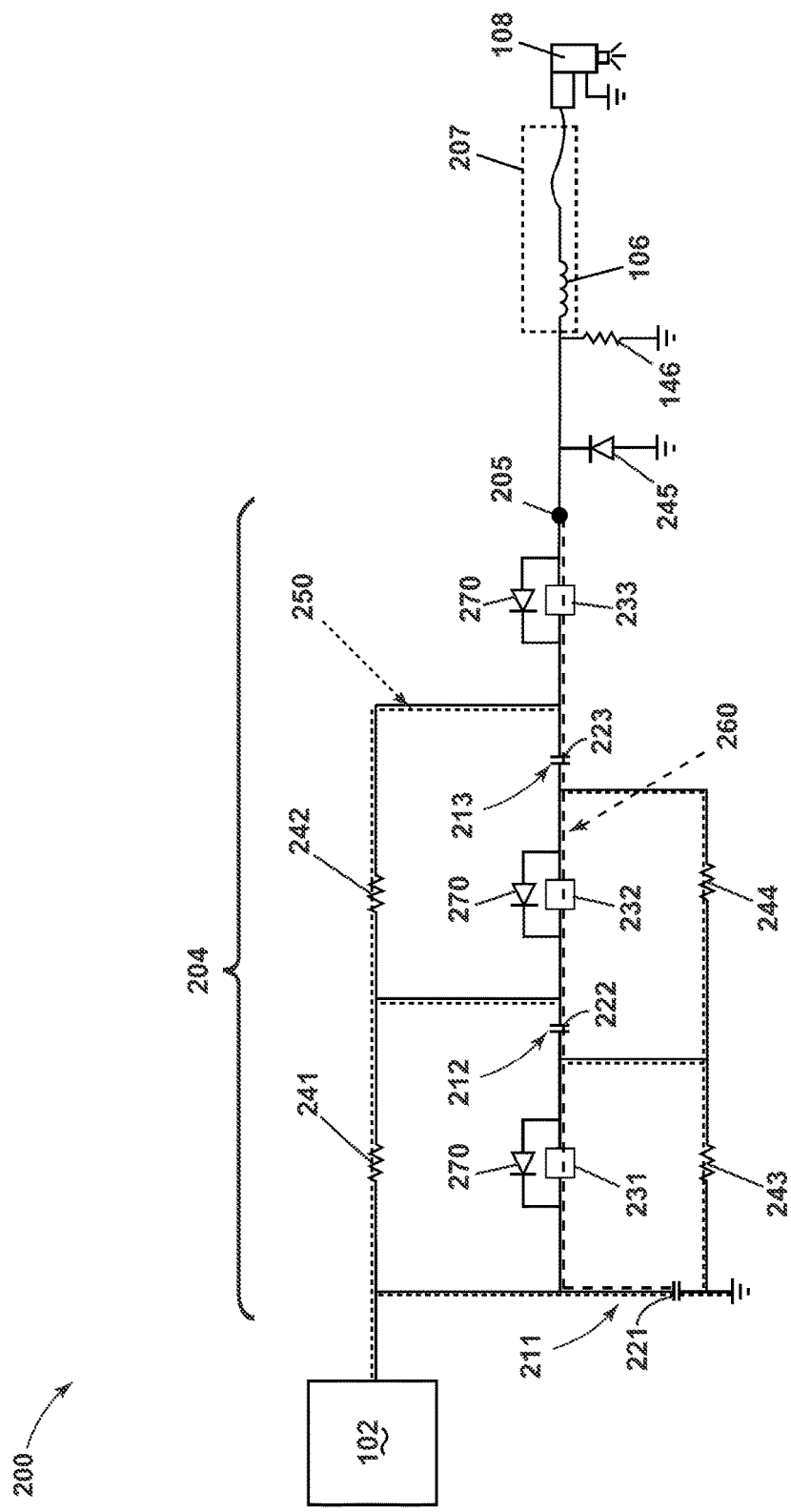
FIG. 4 is a schematic diagram of another ignition system that can be utilized in the turbine engine of FIG. 1 in accordance with various aspects described herein.

Turning to FIG. 4, aspects of another ignition system 200 are illustrated. The ignition system 200 is similar to the ignition system 100; therefore, like parts will be identified with like numerals increased by 100, with it being understood that the description of the like parts of the ignition system 100 applies to the ignition system 200, unless noted otherwise.

The ignition system 200 can include the power supply 102, an energy storage network 204, the inductor 106, an ignition lead 207, and the engine igniter 108 arranged in series. The energy storage network 204 can be electrically coupled to the power supply 102, and can also include a network power output 205 as shown. A clamp rectifier 245 and resistor 146 can also be provided. The clamp rectifier 245 can be in the form of a unipolar diode though this need not be the case.

A first stage 211, second stage 212, and third stage 213 can be provided in the energy storage network 204. Any number of stages can be utilized. The first stage 211 can include a first capacitor 221 and a first switch 231. The second stage 212 can include a second capacitor 222 and a second switch 232. The third stage 213 can include a third capacitor 223 and a third switch 233. Isolation resistors can also be provided. In the example shown, a first resistor 241, second resistor 242, third resistor 243, and fourth resistor 244 are provided. The energy storage network 204 is arranged such that a parallel electrical connection 250 and a series electrical connection 260 can be selectively enabled between the capacitors 221, 222, 223 and the power supply 102 based on a state of the switches 231, 232, 233.

At least one of the first switch 231, second switch 232, or third switch 233 can include a controllable switch or a semicontrollable switch. Some non-limiting examples of controllable switches include a MOSFET, IGBT, SCR, MCT, IGCT, GTO, relay, or the like. Some non-limiting examples of semicontrollable switches include a spark gap, breakover diode, SIDAC, or the like. In one non-limiting example, the first switch 231 can include a controllable switch such an MCT, the second switch 232 and third switch 233 can include a semicontrollable switch such as a spark gap, and the inductor 106 can include an air core coil. In another non-limiting example, each of the first switch 231, second switch 232, and third switch 233 can include a controllable switch, and the inductor 106 can include a saturable reactor.

Regardless of the type of switch utilized, when the switches 231, 232, 233 are each in an open or OFF state, the parallel electrical connection 250 can be enabled between the power supply 102 and the capacitors 221, 222, 223. When the switches 231, 232, 233 are in a closed or ON state, the series electrical connection 260 can be enabled between the network power output 205 and the capacitors 221, 222, 223 such that the capacitors 221, 222, 223 can ultimately provide a summated output power to the network power output 205.

One difference compared to the ignition system 100 is that reverse diodes 270 can be provided in the energy storage network 204 to prevent or accommodate undesirable back currents through the energy storage network 204. In the example shown, reverse diodes 270 are coupled in parallel to each of the first switch 231, second switch 232, and third switch 233. Any number of reverse diodes 270 can be utilized. In some examples, a switch can be provided without use of a reverse diode. In some examples, a reverse diode can be incorporated into the switch.

Another difference compared to the ignition system 100 is that the ignition lead 207 can include the inductor 106. For example, the ignition lead 207 can include a constant inductance or tailored inductance along its length to form the inductor 106. In this manner, the ignition lead 207 with the inductor 106 can provide pulse shaping, smoothing, or other actions thereby forming the modified power output for the engine igniter 108.

In one non-limiting example of operation, the open state of the first switch 231, second switch 232, and third switch 233 can enable or define the parallel electrical connection 250 between the power supply 102 and each of the capacitors 221, 222, 223. When at least the first capacitor 231 is fully charged, its power can be provided to the first switch 231 at a level sufficient to "turn on" the first switch 231 and conduct current in the forward direction. Additionally or alternatively, the first switch 231 can be controllably operated to switch on and conduct current. The second switch 232 can then receive the summated power from the first and second capacitors 221, 222 along the series electrical connection 260. The summated power from the first and second capacitors 221, 222 can cause the second switch 232 to also "turn on" and conduct current in the forward direction. Additionally or alternatively, the second switch 232 can be controllably operated to switch on and conduct current. The third switch 233 can then receive summated power from the first, second, and third capacitors 221, 222, 223, causing it to also "turn on" and conduct current in the forward direction. Additionally or alternatively, the third switch 233 can be controllably operated to switch on and conduct current. In this manner, the stored power in the individual capacitors 221, 222, 223 can be provided in a cascading manner to the switches 231, 232, 233, thereby causing each switch to close and enable or define the series electrical connection 260 between the individual capacitors and the network power output. In addition, the reverse diodes 270 can prevent or accommodate undesired ringing currents through the energy storage network 204.

Figure 5:
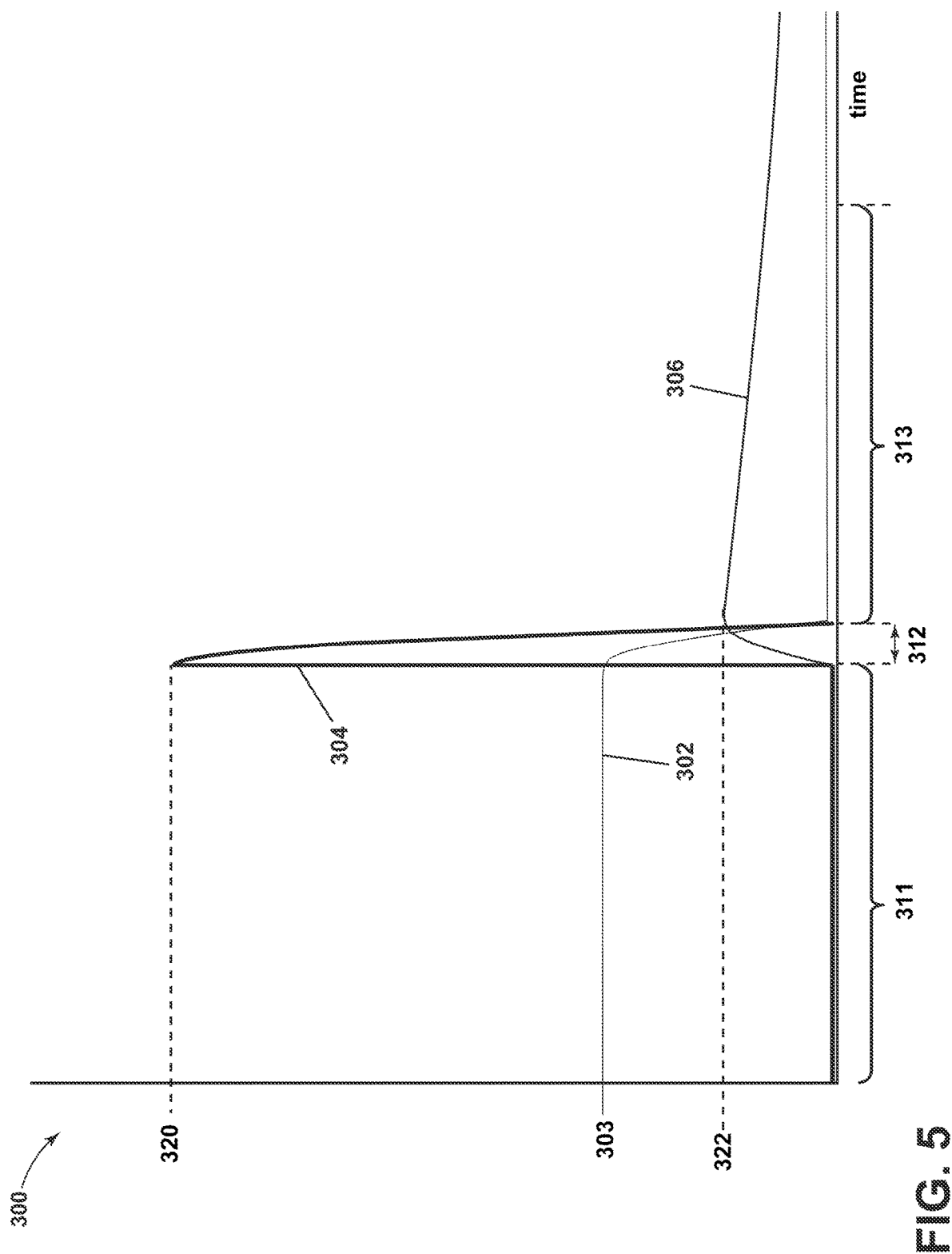
FIG. 5 is a plot graph illustrating aspects of output power characteristics for the ignition system of FIG. 4.

Turning to FIG. 5, a plot graph 300 illustrates one exemplary set of output power characteristics over time during a spark event in the ignition system 200 (FIG. 4). It will be understood that described aspects of the plot graph 300 can apply to either or both of the ignition systems 100, 200. For clarity, the plot graph will be described with respect to the ignition system 200 though the disclosure is not so limited.

An exemplary tank voltage 302 is illustrated representing a voltage across the first capacitor 221, second capacitor 222, or third capacitor 223 (FIG. 4). An exemplary output voltage 304 is illustrated representing the modified output power from the inductor 106 (FIG. 4). Put another way, the exemplary output voltage 304 can represent a voltage across the inductor 106 forming the modified output power due to the inductor 106. An exemplary current 306 is illustrated representing the current supplied to the engine igniter (FIG. 4).

During a first time interval 311, the parallel electrical connection 250 is enabled between the first, second, and third capacitors 221, 222, 223 and the power supply 102 (FIG. 4) as described above. The tank voltage 302 can have an initial value 303 that be constant, or nearly constant, during the first time interval 311. For example, the parallel electrical connection 250 can be enabled prior to the first time interval 311 wherein charging of the first, second, and third capacitors 221, 222, 223 can occur prior to the first time interval 311. The first, second, and third capacitors 221, 222, 223 can be fully charged, or nearly fully charged, during the first time interval 311. In addition the current 306 and the output voltage 304 can be zero, or nearly zero, during the first time interval 311.

During a second time interval 312, the parallel electrical connection 250 can be disabled and the series electrical connection 260 enabled between the first, second, and third capacitors 221, 222, 223 and the inductor 106 (FIG. 4) as described above. The tank voltage 302 can decrease as the series-connected first, second, and third capacitors 221, 222, 223 discharge their stored energy to the network power output 205 (FIG. 4). The output voltage 304 can be provided as an output pulse having a pulse peak 320 as shown. The current 306 supplied to the engine igniter 108 (FIG. 4) can rise from zero, or nearly zero, to a current peak 322 as shown. The inductor 106 can provide pulse smoothing or shaping during the second time interval 312. For example, the inductor 106 receiving current from the network power output 205 can cause the current 306 to initially rise at a high rate, and later rise at a slower rate, as illustrated by the decreasing slope of the current 306 during the second time interval 312 prior to reaching the current peak 322.

It should be appreciated that the series electrical connection 260 (FIG. 4) enables the summated output voltage 304 including the multiplied tank voltage 302. In the example of FIG. 4 having three stages, the pulse peak 320 can be three times the initial value 303 of the tank voltage 302. In another example where N capacitors are provided, the output voltage 304 can have a peak value of N times the initial value 303 of the tank voltage 302. In addition, while the output voltage 304 is illustrated with a sharp turn between the first time interval 311 and second time interval 312, it will be understood that the output voltage 304 can also smoothly increase between the first time interval 311 and second time interval 312.

During a third time interval 313, the tank voltage 302 and the output voltage 304 can both be zero, or nearly zero. The current 306 supplied to the engine igniter 108 can fall from the current peak 322. The engine igniter 108 (FIG. 4) receiving the current 306 can produce a spark during at least a portion of the third time interval 313, including during the entire third time interval 313.

Figure 6:
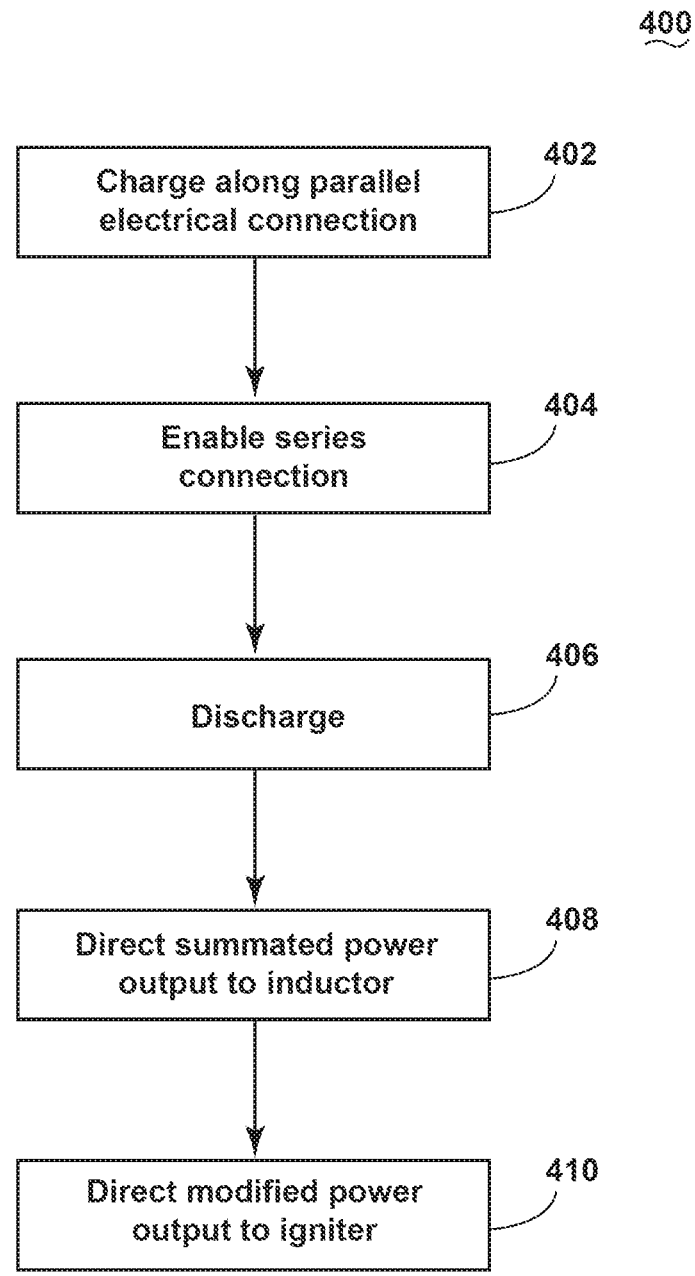
FIG. 6 is a flowchart illustrating a method of generating an ignition spark.

FIG. 6 illustrates a method 400 of generating an ignition spark in a gas turbine engine igniter, such as in the ignition system 100, 200. The method 400 begins at 402 by charging, via a power source, at least a first capacitor and a second capacitor along a parallel electrical connection between the power source, the first capacitor, and the second capacitor. At 404 the method 400 includes enabling a series electrical connection between the first capacitor and the second capacitor. At 406 the method 400 includes discharging the first capacitor and the second capacitor along the series electrical connection to generate a summated power output. At 408 the method 400 includes directing the summated power output to an inductor to form a modified power output. In one non-limiting example, the inductor can be in the form of a saturable reactor. At 410 the method 400 includes directing the modified power output to the igniter for generating an ignition spark. The method 400 can also include directing the summated power output through a coil of the inductor to saturate a core of the inductor, thereby modifying an inductance of the inductor to form the modified power signal.

Figure 7:
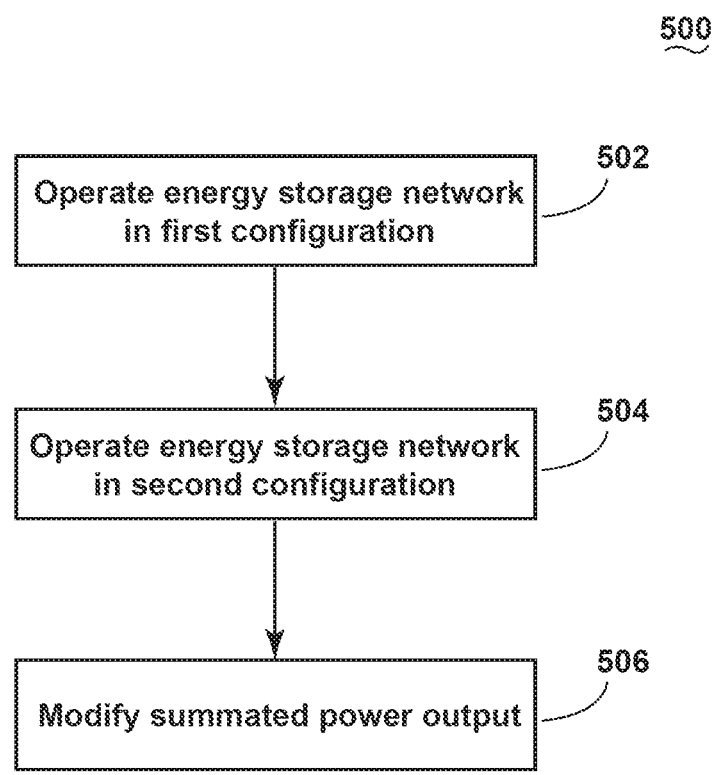
FIG. 7 is a flowchart illustrating a method of operating a turbine engine ignition system.

FIG. 7 illustrates a method 500 of operating a turbine engine ignition system, such as the ignition system 100, 200. The method 500 begins at 502 by operating an energy storage network of the turbine engine ignition system in a first configuration enabling a parallel electrical connection between a power source, a first capacitor, and a second capacitor for charging the first capacitor and the second capacitor. At 504 the method 500 includes operating the energy storage network in a second configuration enabling a series electrical connection between the first capacitor and the second capacitor for generating a summated power output. At 506 the method 500 includes modifying, by way of an inductor, the summated power output to form a modified power output for an igniter in the turbine engine ignition system. The method 500 can also include wherein the turbine engine ignition system further comprises a first switch and a second switch, each of the first switch and the second switch having an open state and a closed state. The method 500 can also include wherein the first configuration is at least partially defined by each of the first switch and the second switch being in the open state. The method 500 can also include wherein the second configuration is at least partially defined by each of the first switch and the second switch being in the closed state. The method 500 can also include directing the summated power output through a coil of the inductor to saturate a core of the inductor, thereby modifying an inductance of the inductor to form the modified power output.

The described aspects of the present disclosure provide for an energy storage network having N stages and N switches, with each switch having an open state and a closed state, a parallel electrical connection defined between the power supply and the N storage capacitors when each of the N switches are in the open state, and a series electrical connection defined between the overall power output and the N capacitors when each of the N switches are in the closed operating state, the series electrical connection defining the power output. In some examples, the first stage can include a first capacitor and a first switch, followed by N−1 identical stages each including an energy storage capacitor and switch. In some examples, the first switch can be different from the remaining switches in the energy storage network. In some examples, the energy storage network provides an overall power output that can be modified by an inductor. In some examples, the inductor can be in the form of a saturable reactor. In some examples, the inductor can be in the form of an air core coil. In some examples, the switches of the energy storage network can be in the form of controllable switches, such as MOSFET, IGBT, SCR, MCT, IGCT, GTO, relay, or the like. In some examples the switches of the energy storage network can be semicontrollable switches, such as spark gap, breakover diode, SIDAC, or the like. In some examples, the energy storage network can include controllable switches and the inductor can be in the form of a saturable reactor. In some examples, the energy storage network can include semicontrollable switches and the inductor can be in the form of an air core coil.

Aspects of the disclosure provide for a variety of benefits. The use of a staged circuit provides for simultaneous charging of energy storage capacitors along a parallel electrical connection, and for summated discharging of the energy storage capacitors along the series electrical connection. The described aspects also provide for the use of lower-cost, readily available components, as the power supply and energy storage capacitors can be operated at a lower voltage while still providing the needed high-voltage pulse for producing an ignition spark.

In addition, the inductor forming the modified power output provides pulse shaping, slowing, or smoothing to improve the quality of the spark generated in the engine igniter. The inductor forming the modified power output can further provide for circuit protection, as current through closed switches is slowly increased which reduces or eliminates turn-on jitter in the circuit. The combination of the inductor and clamp rectifier provides for additional pulse shaping. It can be appreciated that sudden increases in current at the network power output due to closing of switches can otherwise introduce pinging, back currents, or other undesired effects if the engine igniter were to be directly connected to the network power output. The inductor can provide for slowing of the pulse rise time, that is otherwise not found in a Marx-generator-style circuit, thereby providing output power characteristics needed for producing an ignition-quality spark in a turbine engine environment.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples for disclosure of various embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

An ignition system for igniting fuel in a gas turbine engine, comprising a power supply, an energy storage network electrically connected to the power supply and having a network power output capable of providing output power, the energy storage network comprising a first stage having a first capacitor and a first switch, with the first switch having an open state and a closed state, a second stage having a second capacitor and a second switch, with the second switch having an open state and a closed state, a parallel electrical connection defined between the power supply, the first capacitor, and the second capacitor when each of the first switch and the second switch are in the open state, and a series electrical connection defined between the first capacitor, the second capacitor, and the network power output when each of the first switch and the second switch are in the closed state, the series electrical connection defining the output power, an inductor electrically coupled to the network power output and configured to form a modified output power based on output power received from the network power output, and an engine igniter electrically coupled to the inductor and configured to produce an ignition spark upon receiving the modified output power.

The ignition system of any preceding clause, wherein the energy storage network further comprises a first resistor electrically connected to the first capacitor and the first switch.

The ignition system of any preceding clause, wherein the energy storage network further comprises a second resistor electrically connected to the second capacitor and the second switch.

The ignition system of any preceding clause, further comprising an ignition lead electrically coupled to the engine igniter and to the network power output, with the ignition lead comprising the inductor.

The ignition system of any preceding clause, wherein the inductor comprises an inductor coil electrically coupled to the network power output and wound about a magnetically-saturable core.

The ignition system of any preceding clause, wherein at least one of the first switch or the second switch comprises one of a controllable switch or a semicontrollable switch.

The ignition system of any preceding clause, wherein the inductor comprises a saturable reactor.

The ignition system of any preceding clause, wherein the first switch and the second switch each comprise a controllable switch, and wherein the inductor comprises a saturable reactor.

The ignition system of any preceding clause, further comprising a comparator electrically coupled to the energy storage network and configured to compare an overall voltage of the energy storage network with a predetermined threshold voltage.

The ignition system of any preceding clause, further comprising a clamp rectifier electrically coupled to the inductor.

The ignition system of any preceding clause, wherein the modified output power comprises at least one of a pulse voltage between 800 V and 1200 V, a pulse current between 200 A and 1000 A, a pulse duration between 1 microsecond and 200 microseconds, or a pulse width between 1 microsecond and 10 microseconds.

A gas turbine engine, comprising a compressor, a combustor, and a turbine in axial flow arrangement, and an ignition system coupled to the combustor for igniting fuel therein, the ignition system comprising an energy storage network electrically connectable with a power supply and having a network output capable of providing output power, the energy storage network comprising a first stage having a first capacitor and a first switch, with the first switch having an open state and a closed state, a second stage having a second capacitor and a second switch, with the second switch having an open state and a closed state, a parallel electrical connection defined between the power supply, the first capacitor, and the second capacitor when each of the first switch and the second switch are in the open state, and a series electrical connection defined between the network power output, the first capacitor, and the second capacitor when each of the first switch and the second switch are in the closed state, the series electrical connection defining the power output, a inductor electrically coupled to the network power output and configured to form a modified output power based on output power received from the network power output, and an engine igniter electrically coupled to the inductor and configured to produce an ignition spark upon receiving the modified output power.

The gas turbine engine of any preceding clause, wherein the inductor comprises an inductor coil electrically coupled to the network power output and wound about a magnetically-saturable core.

The gas turbine engine of any preceding clause, wherein at least one of the first switch or the second switch comprises one of a controllable switch or a semicontrollable switch.

The gas turbine engine of any preceding clause, wherein the first switch and the second switch each comprise a controllable switch, and wherein the inductor comprises a saturable reactor.

The gas turbine engine of any preceding clause, wherein the first switch and the second switch each comprise a controllable switch, and wherein the inductor comprises a saturable reactor.

A method of operating a turbine engine ignition system, the method comprising operating an energy storage network of the turbine engine ignition system in a first configuration enabling a parallel electrical connection between a power source, a first capacitor, and a second capacitor for charging the first capacitor and the second capacitor, operating the energy storage network in a second configuration enabling a series electrical connection between the first capacitor and the second capacitor for generating a summated power output, and modifying, by way of a inductor, the summated power output to form a modified power output for an igniter in the turbine engine ignition system.

The method of any preceding clause, wherein the turbine engine ignition system further comprises a first switch and a second switch, each of the first switch and the second switch having an open state and a closed state, and wherein the first configuration is at least partially defined by each of the first switch and the second switch being in the open state.

The method of any preceding clause, wherein the second configuration is at least partially defined by each of the first switch and the second switch being in the closed state.

The method of any preceding clause, further comprising directing the summated power output through a coil of the inductor to saturate a core of the inductor, thereby modifying an inductance of the inductor to form the modified power output.

A method of generating an ignition spark in a gas turbine engine igniter, the method comprising charging, via a power source, at least a first capacitor and a second capacitor along a parallel electrical connection between the power source, the first capacitor, and the second capacitor, enabling a series electrical connection between the first capacitor and the second capacitor, discharging the first capacitor and the second capacitor along the series electrical connection to generate a summated power output, directing the summated power signal to a inductor to form a modified power signal, and directing the modified power signal to the igniter for generating an ignition spark.

What is claimed is:

1. An ignition system for igniting fuel in a gas turbine engine, comprising:
    a power supply;
    an energy storage network electrically connected to the power supply and having a network power output capable of providing output power, the energy storage network comprising:
        a first stage having a first capacitor and a first switch, with the first switch having an open state and a closed state;
        a second stage having a second capacitor and a second switch, with the second switch having an open state and a closed state;
        a parallel electrical connection defined between the power supply, the first capacitor, and the second capacitor when each of the first switch and the second switch are in the open state; and
        a series electrical connection defined between the first capacitor, the second capacitor, and the network power output when each of the first switch and the second switch are in the closed state, the series electrical connection defining the output power;

an inductor electrically coupled to the network power output and configured to form a modified output power based on the output power received from the network power output; and an engine igniter electrically coupled to the inductor and configured to produce an ignition spark upon receiving the modified output power.

2. The ignition system of claim 1, wherein the energy storage network further comprises a first resistor electrically connected to the first capacitor and the first switch.

3. The ignition system of claim 2, wherein the energy storage network further comprises a second resistor electrically connected to the second capacitor and the second switch.

4. The ignition system of claim 1, further comprising an ignition lead electrically coupled to the engine igniter and to the network power output, with the ignition lead comprising the inductor.

5. The ignition system of claim 1, wherein the inductor comprises an inductor coil electrically coupled to the network power output and wound about a magnetically-saturable core.

6. The ignition system of claim 1, wherein at least one of the first switch or the second switch comprises one of a controllable switch or a semicontrollable switch.

7. The ignition system of claim 6, wherein the inductor comprises a saturable reactor.

8. The ignition system of claim 1, wherein the first switch and the second switch each comprise a controllable switch, and wherein the inductor comprises a saturable reactor.

9. The ignition system of claim 1, further comprising a comparison module electrically coupled to the energy storage network and configured to compare an overall voltage of the energy storage network with a predetermined threshold voltage.

10. The ignition system of claim 1, further comprising a clamp rectifier electrically coupled to the inductor.

11. The ignition system of claim 1, wherein the modified output power comprises at least one of a pulse voltage between 800 V and 25,000 V, a pulse current between 200 A and 2000 A, a pulse duration between 1 microsecond and 300 microseconds, or a pulse width between 1 microsecond and 10 microseconds.

12. A gas turbine engine, comprising:
a combustor; and
an ignition system coupled to the combustor for igniting fuel therein, the ignition system comprising:
an energy storage network electrically connectable with a power supply and having a network power output capable of providing output power, the energy storage network comprising:
a first stage having a first capacitor and a first switch, with the first switch having an open state and a closed state;
a second stage having a second capacitor and a second switch, with the second switch having an open state and a closed state;
a parallel electrical connection defined between the power supply, the first capacitor, and the second capacitor when each of the first switch and the second switch are in the open state; and
a series electrical connection defined between the network power output, the first capacitor, and the second capacitor when each of the first switch and the second switch are in the closed state, the series electrical connection defining the network power output;

an inductor electrically coupled to the network power output and configured to form a modified output power based on the output power received from the network power output; and an engine igniter electrically coupled to the inductor and configured to produce an ignition spark upon receiving the modified output power.

13. The gas turbine engine of claim 12, wherein the inductor comprises an inductor coil electrically coupled to the network power output and wound about a magnetically-saturable core.

14. The gas turbine engine of claim 12, wherein at least one of the first switch or the second switch comprises one of a controllable switch or a semicontrollable switch.

15. The gas turbine engine of claim 14, wherein the inductor comprises a saturable reactor.

16. The gas turbine engine of claim 15, wherein the first switch and the second switch each comprise the controllable switch, and wherein the inductor comprises the saturable reactor.

17. A method of operating a turbine engine ignition system, the method comprising:
operating an energy storage network of the turbine engine ignition system in a first configuration enabling a parallel electrical connection between a power source, a first capacitor, and a second capacitor for charging the first capacitor and the second capacitor;

operating the energy storage network in a second configuration enabling a series electrical connection between the first capacitor and the second capacitor for generating a summated power output; and modifying, by way of a inductor, the summated power output to form a modified power output for an igniter in the turbine engine ignition system.

18. The method of claim 17, wherein the turbine engine ignition system further comprises a first switch and a second switch, each of the first switch and the second switch having an open state and a closed state, and wherein the first configuration is at least partially defined by each of the first switch and the second switch being in the open state.

19. The method of claim 18, wherein the second configuration is at least partially defined by each of the first switch and the second switch being in the closed state.

20. The method of claim 17, further comprising directing the summated power output through a coil of the inductor to saturate a core of the inductor, thereby modifying an inductance of the inductor to form the modified power output.

* * * * *